United States Patent [19]

Robinson et al.

[11] Patent Number: 4,671,210

[45] Date of Patent: Jun. 9, 1987

[54] AUTOMATIC ANIMAL FEEDER

[76] Inventors: Donavan E. Robinson, 6517 N. Augusta Ave., Fresno, Calif. 93710; Skeffington I. Robinson, 1758 Hays Dr., Newbury Park, Calif. 91320

[21] Appl. No.: 742,324

[22] Filed: Jun. 7, 1985

[51] Int. Cl.⁴ .............................................. A01K 5/02
[52] U.S. Cl. .................................................. 119/51.12
[58] Field of Search .............. 119/51.11, 51.12, 51.13, 119/51.5

[56] References Cited

U.S. PATENT DOCUMENTS

| 3,631,840 | 1/1972 | McCormack | 119/51.12 |
| 3,826,231 | 7/1974 | Crawford et al. | 119/51.12 |
| 3,946,702 | 3/1976 | Mazzini | 119/51.13 |
| 4,185,588 | 1/1980 | Harris | 119/51.12 |
| 4,248,175 | 2/1981 | Navarro | 119/51.12 |
| 4,421,059 | 12/1983 | Cousino | 119/51.12 |
| 4,501,229 | 2/1985 | Williamson | 119/51.12 |

FOREIGN PATENT DOCUMENTS 2037140  7/1980  United Kingdom ............ 119/51.11

Primary Examiner—Robert P. Swiatek
Attorney, Agent, or Firm—Dicke, Jr. Allen A.

[57] ABSTRACT

The automatic animal feeder is adapted to provide food and water to an animal on a periodic basis. The feeder has a base. A tray is rotatably mounted on the base, and the tray has a plurality of food and water containers. A motor is connected to rotate the tray and a timer causes periodic operation of the motor. A cover assembly is removably secured on the base to cover portions of the tray.

17 Claims, 4 Drawing Figures

AUTOMATIC ANIMAL FEEDER

BACKGROUND OF THE INVENTION

1. Field of the Invention.

The present invention relates to an automatic animal feeder and more particularly to such an automatic feeder adapted to provide food and water for domestic or laboratory animals at time spaced intervals.

2. Description of the Prior Art.

It is well known that the feeding of many non-foraging animals requires the intervention of humans to insure that adequate quantities of food and water are available to the animal on a substantially regular, periodic basis. The environments in which the scheduled feeding of predetermined quantities of food and water to an individual animal or a multiplicity of animals is necessary are numerous.

For instance, many owners of pets, such as dogs and cats, are, on occasion, required to be absent from their residences and are unable to obtain adequate or reliable human help in feeding and providing water to their pets. Similarly, in environments in which numerous animals are individually housed in a community setting, such as a kennel, poultry plant, or the like, the varying individual animals within the community will, in many instances, require differing quantities of food and water, as well as differing numbers of feedings.

Thus, a periodic replenishment of food and water for consumption by the various animals can and often does become a laborious, time-consuming task for persons charged with the responsibility. Also exemplary of such a typical environment is one in which experimental animals are maintained in multiples, the individual members of which have particularized nutritional requirements and must be fed prescribed quantities of food at closely regulated intervals.

Various devices have been proposed as means for providing a supply of food and water to unattended animals. However, such devices invariably are attended by one or more deficiencies. For instance, some by their design are incapable of being constructed compactly or to provide ease of portability thereof. Others are limited as to the quantities of food and water they can contain and the periods of time over which they are useful. Moreover, some previously proposed apparatuses require that the animal itself be trained to operate the apparatus to provide itself with food. Many of the previously described automatic feeders involve time controlled devices for dropping or presenting food to animals. Regardless of design, these devices for the most part are mechanically cumbersome and rigid in their utilization. Patented feeders encompassing rotative parts depend on the utilization of such crude devices as ratchet wheels or sleeves with saw-tooth notches for assisting the termination of movement of these rotative parts.

Accordingly, it has long been known that it would be desirable to have an automated animal feeding apparatus having a compact design, reliable operation and flexibility to accommodate the feeding needs of varying sizes and types of animals of different appetites.

OBJECTS AND SUMMARY OF THE INVENTION

Therefore, it is an object of the present invention to provide an improved automated animal feeder apparatus.

Another object is to provide such an apparatus which is adapted to be constructed compactly.

Another object is to provide such an apparatus which can provide single or multiple individual portions of food and water over an extended period of time.

Another object is to provide such an apparatus which is characterized by ease of maintenance and cleaning thereof, as well as reliability of function.

Another object is to provide such an apparatus which can be manufactured economically and sold at a nominal price.

Another object is to provide an automatic animal feeder employing integrated circuit timers to initiate the rotative movement of a food platform through the use of a geared electric motor.

Another object is to provide such an animal feeder having a rotation interval of a food platform precisely terminated electronically, thus eliminating the need for mechanical gadgets for braking the system.

Another object is to provide an automatic animal feeder which allows the operator, through a digital time read-out clock and a programmable timer to select the exact feeding time (or times) during the day as well as to select the time intervals between feedings.

Another object is to provide an automatic animal feeder utilizing a direct and simple drive system which eliminates the need for such devices as ratchet wheels, pulleys and pulley belts with inherent adjustment requirements.

Another object is to provide an automatic animal feeder wherein blackout protection is afforded through the use of an alternate battery power source to the digital clock so that temporary electrical power interruptions do not necessitate reprogramming of the feeder to ensure feed availability at the preset intervals.

Another object is to provide an automatic animal feeder with an audible alarm and alarm shut-off system to alert the animal whenever food is presented and also to afford assurance to the owner (operator) that the system is functioning.

Another object is to provide an automatic animal feeder wherein the electronic circuitry is located in a separate, partitioned compartment thereby affording protection of these parts from water and foreign objects during routine cleaning and loading operations.

Another object is to provide an automatic animal feeder with a right angular distal segment designed to facilitate corner locations. The right angled configuration along with the low profile, a non-skid base and an extended frontal apron (upon which the animal partially stands while feeding) also contribute to stability in providing a secure anchoring system.

Further objects and advantages are to provide improved elements and arrangements thereof in an animal feeder for the purposes described which is dependable, economical, durable and fully effective in accomplishing its intended purposes.

DESCRIPTION OF THE PREFERRED EMBODIMENT

Figures 1, 2:
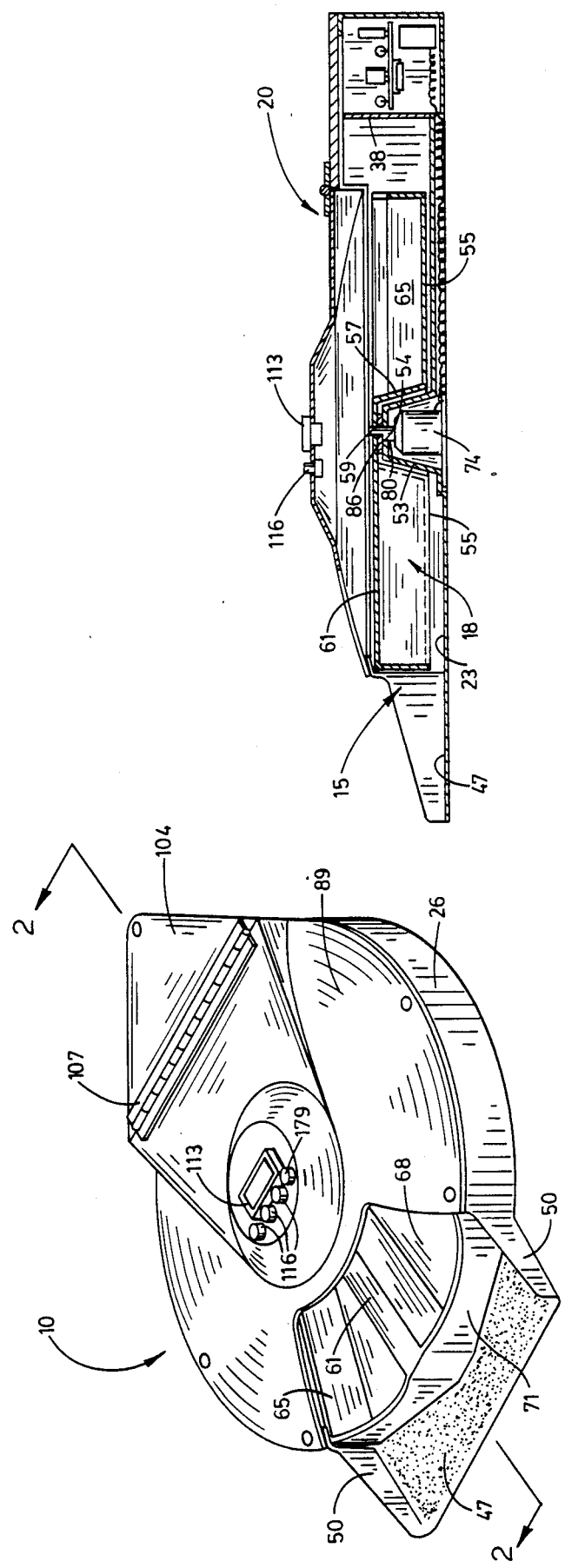
FIG. 1 is a perspective view of an animal feeding apparatus embodying the principles of the present invention.
FIG. 2 is a transverse section taken on line 2—2 in FIG. 1.
Figure 3:
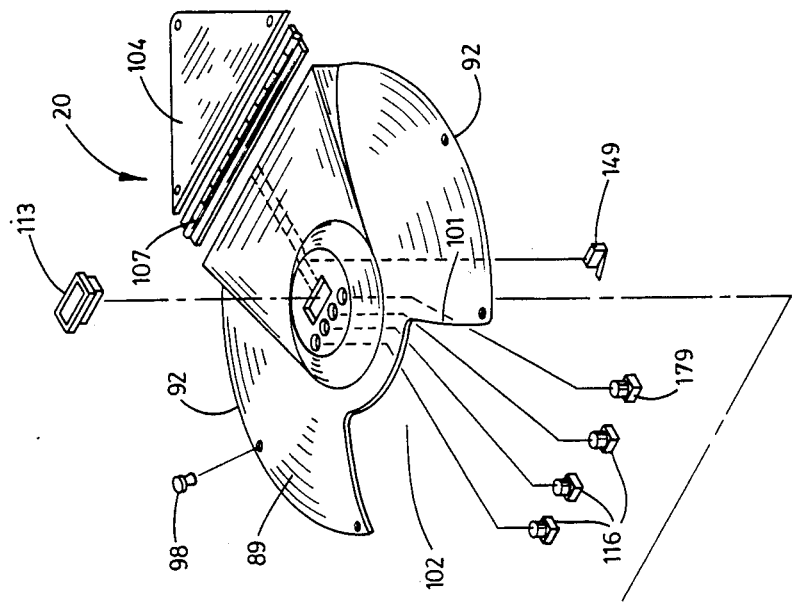
FIG. 3 is an exploded view showing the components of the apparatus of FIG. 1.
Figure 3:
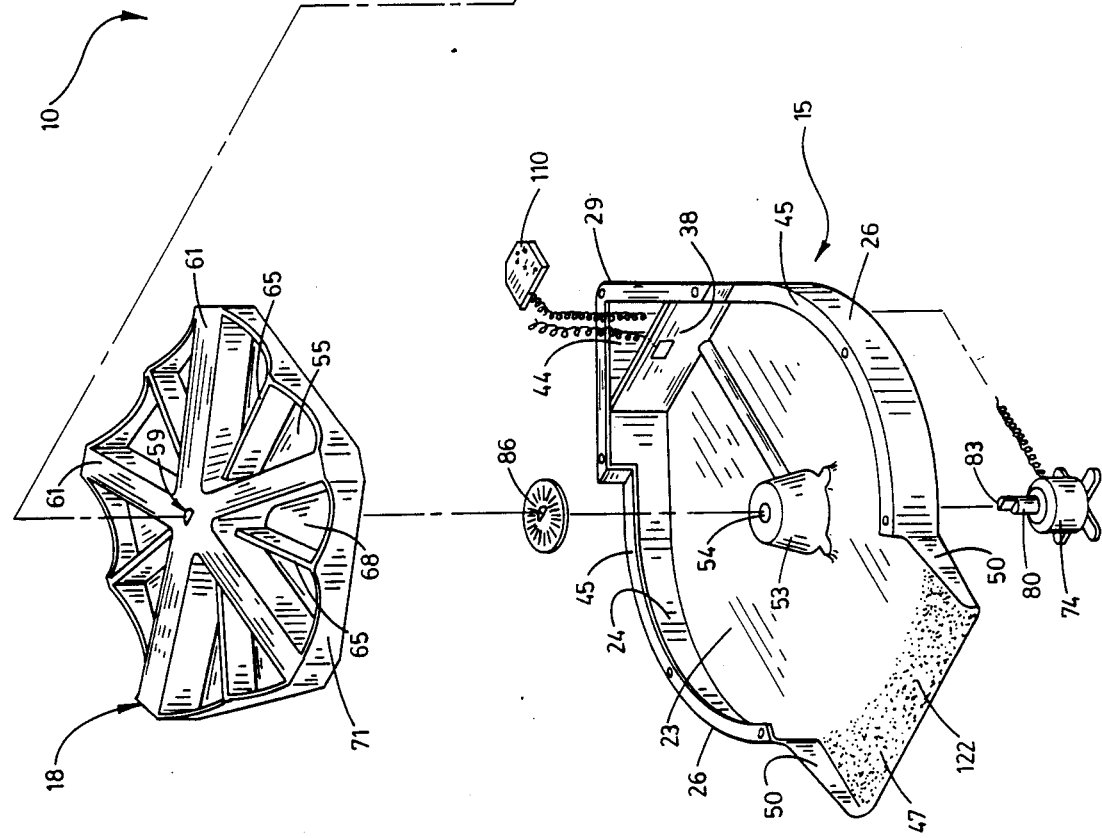
Figure 4:
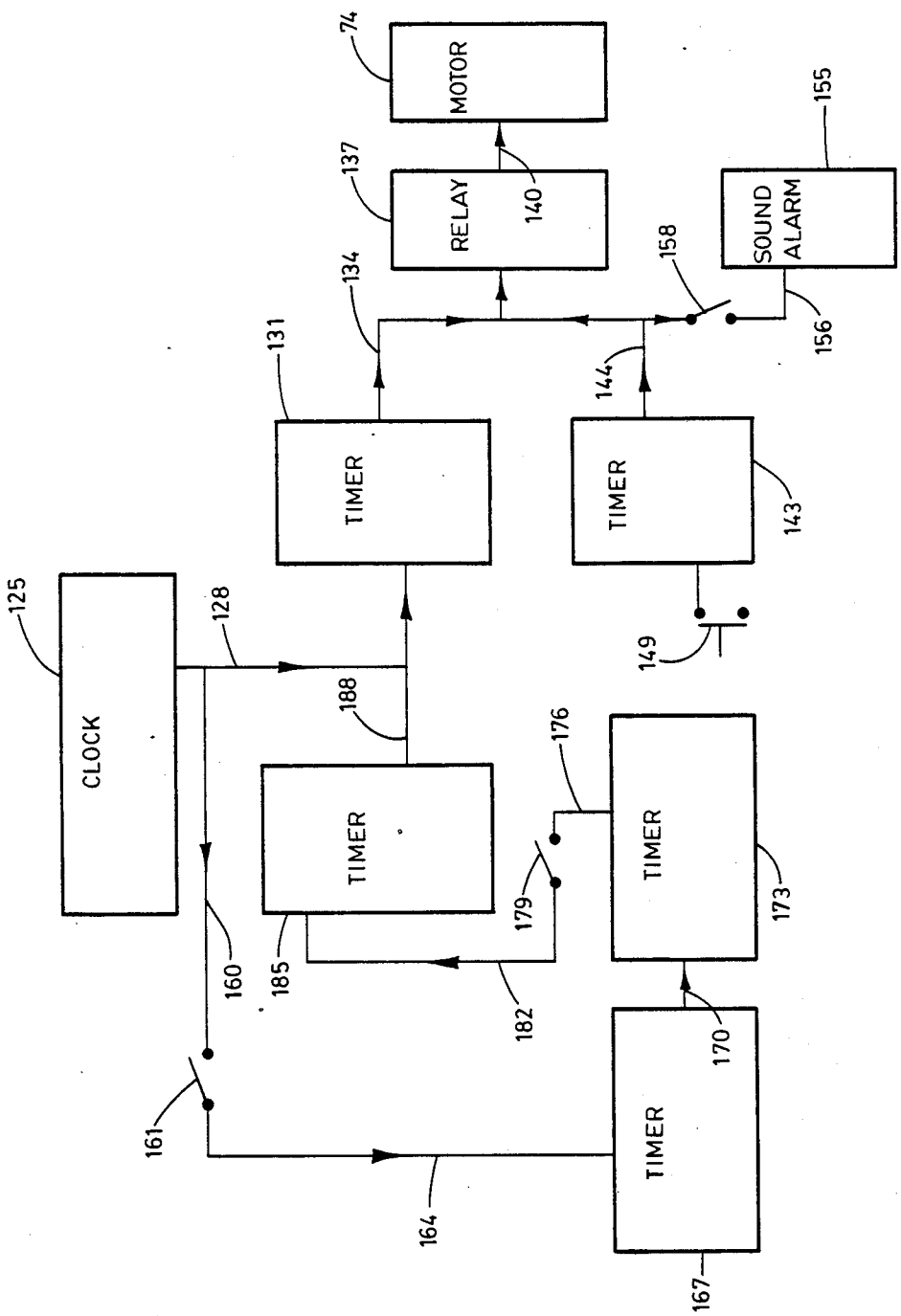
FIG. 4 is a schematic diagram of an electrical circuit adapted for use in the apparatus of FIG. 1.

Referring more particularly to the drawings, the animal feeder of the present invention is designated generally by the numeral 10 in FIGS. 1, 3 and 4. As can best be seen in FIG. 3, the animal feeder 10 generally provides a housing or base portion 15; a tray or carousel portion 18; and a cover assembly 20.

The base portion 15 provides a substantially flat bottom panel 23 bounded by a substantially upright wall 24 having a pair of curved side portions 26 extending forwardly from a distal or rearmost portion 29. In the rearmost portion, the side portions 26 are substantially straight and are disposed in substantially perpendicular relation to each other. The straight areas are of greater height relative to the bottom panel 23 than are the curved portions.

An interior wall 38 is disposed rearwardly on the bottom panel 23 in a substantially upright attitude interconnecting the straight areas of the side portions 26 and bounding a chamber 44 therebetween. Each of the curved side portions 26 provides a lip 45 extending inwardly from the side portions and disposed in substantially parallel relation to the bottom panel 23. The forwardmost or proximal end portions of the side portions 26 are spaced from each other a predetermined distance. Extending forwardly from and continuous with the bottom panel is a substantially flat flange or foot portion 47 having a width substantially equivalent to the distance by which the forwardmost portions of the curved side portions 26 are spaced from each other. The foot portion 47 is bounded on its opposite ends by a pair of upstanding side panels 50.

Preferably, the foot portion 47 has a surface 122 constructed of a material having a high coefficient of friction in order to minimize slippage of the foot of the animal from the foot portion when an animal is standing with one or both forefeet on the foot portion. Similarly, it is desirable that the lowermost surface of the bottom panel 23 of the base portion 15 be constructed of a material having a resistance to slippage upon a supporting surface or be coated with such a material, such as rubber or other suitable material.

A motor housing 53 extends upwardly from an approximate center point of the bottom panel. The motor housing 53 provides a substantially centrally disposed upright bore 54.

The carousel portion 18 has a substantially flat bottom panel 55 of polygonal configuration. In the preferred embodiment, the carousel is pentagonal, although it is recognized that the carousel portion can have greater than or less than five sides.

Substantially centrally of the bottom panel 55, the carousel portion 18 provides a chamber 57 dimensioned to be received substantially loosely about the motor housing 53 for rotation relative thereto. Communicating through the carousel portion and aligned with the chamber 57 is a bore 59 of predetermined dimensions. The bore is substantially symmetrical about an axis about which the carousel portion is adapted to rotate, as is hereafter described in greater detail. Radiating outwardly from the bore are five divider bars 61 spaced substantially equidistantly from each other and of substantially identical configurations and dimensions.

Radiating outwardly substantially equidistantly between each adjacent pair of divider bars 61 is a divider panel 65 disposed in substantially upstanding relation to the bottom panel 55. Each pair of adjacent divider panels 65 together with the divider bars 61 therebetween, bound and define a pair of substantially equally dimensioned containers 68 of predetermined volume. As can best be seen in FIG. 3, the containers are substantially wedge-shaped. The portion of each container remote from the bore 59 is bounded by an upstanding side wall 71 of predetermined height extending upwardly from the periphery of the bottom panel 55.

A geared electric motor 74 is nested within the motor housing 53 and provides a rotary shaft 80 extending upwardly therefrom and adapted to be rotated about an axis of rotation substantially coaxially with the bore 54 of the motor housing and the bore 59 of the carousel portion 18. The shaft 80 is dimensioned to extend in the bore 59. The shaft provides an angular or semi-cylindrical terminus 83. The bore 59 provides an internal wall configured substantially closely to conform to the angular configuration of the terminus 83 of the shaft 80 for engagement of the carousel portion 18 by the shaft and for rotation therewith. A suitable bearing member 86 is provided between the motor housing 53 and the chamber 57 of the carousel portion 18 to limit friction therebetween upon rotation of the carousel portion. The carousel portion is received atop the motor housing 53 for rotation within the wall 24 of the base portion 15.

The cover portion 20 provides a primary panel 89 having a pair of spaced side edges 92 configured substantially closely to conform to the configuration of the curved sides 26 of the wall 24 of the base portion 15. The side edges 92 are secured to the lips 45 atop the wall 24, as by screws 98 or the like. The primary panel 89 further provides a forward edge 101 recessed into the panel and configured and dimensioned to permit access through an opening or aperture 102 defined thereby to an adjacent pair of containers 68 bounded by a pair of adjacent divider bars or panels 65. A secondary panel 104 is secured as by a hinge 107 or the like to the rearmost portion of the primary panel 89 and is dimensioned and configured closely to conform to the upper edge of the side portions in the rearmost portion 29 of the base portion and to be disposed in covering relation to the chamber 44.

An electrical circuit 110 adapted for use in controlling the operation of the geared electric motor 74 is mounted within the chamber 44 and is connected in electrically-conductive relation to the electric motor, digital display 113, control buttons 116 and switches 149 and 179. The electrical circuit is described in greater detail hereafter. Further, the circuit preferably has alternate sources of power, such as a battery, not shown, so that if one source fails or is deliberately interrupted, the other takes over to avoid a failure of continuity, accurate timing, or other functional impairment.

A timer display 113 is borne substantially centrally by the primary panel 89 and a plurality of control actuating buttons 116 are mounted by the primary panel for control of the operation of the device 10, as is described hereafter in greater detail.

The circuit 110 adapted for use in controlling the operation of the device 10 is depicted schematically in FIG. 4. As shown therein, a clock mechanism 125 is connected to an electrical conductor 128 which is connected to a first timer 131. The first timer 131 is connected by electrical conductor 134 to a relay 137 which is connected through electrical conductor 140 to the geared electric motor 74. A second timer 143 is connected to an electrical conductor 144 which is connected to electrical conductor 134 leading to the relay 137. A paddle type microswitch 149 is mounted on the underside of cover 20 and is connected to the second timer in such a manner and position that on rotation of carousel 18 divider bar 61 contacts and closes switch 149 to deactivate motor 74 so that a complete segment of food and water is exposed at aperture 102. A sound alarm 155 is connected to the electrical conductor 144 by an electrical conductor 156 bearing a switch 158 which, when opened, disables the sound alarm. An electrical conductor 160 leads from the electrical conductor 128 to a switch 161. An electrical conductor 164 leads from the switch 161 to a third integrated circuit timer 167. The third timer is connected by an electrical conductor 170 to a fourth integrated circuit timer 173. An electrical conductor 176 leads from the fourth timer to a switch 179. An electrical conductor 182 leads from the switch 179 to a fifth integrated circuit timer 185. An electrical conductor 188 leads from the fifth timer 185 to the electrical conductor 128 leading to the first timer 131. The capabilities of the system are, of course, dependent upon the integrated circuits chosen for the construction of the timers as well as the numbers of the timers employed in the construction of the device. At least two timers are preferably used, with the maximum number of timers capable of utilization limited only by the number of feeding intervals during which the device is adapted to operate.

In the circuit diagram illustrated in FIG. 4, the operation of the motor 74 is initially controlled by the first integrated circuit timer 131 and the second integrated circuit timer 143. The provision of voltage-high and voltage-low states across the relay 137 activate and deactivate, respectively, the motor 74. During periods of deactivation of the motor, the output of the first timer 131 is at a voltage-high state, while that of the second timer 143 is at a low state.

The clock 125 is adapted initially to provide a trigger pulse at the first timer. The trigger pulse switches the first timer 131 to a low-voltage state and causes closing of the contacts of the relay 137 to activate the motor 74.

The switch 149, upon closing, releases a stored supply of current to the trigger portion of the second timer 143, causing the output of the second timer to switch to a high state. Retriggering of the second timer does not occur unless the switch 149 is first opened and then closed again. The high-voltage state of the second timer opens the contacts of the relay 137 to deactivate the motor 74. The duration of the output of the first and second timers is preferably programmed to provide activation of the second timer subsequent to that of the first timer, and to provide sufficient time for the motor to rotate the carousel portion 18 to a predetermined second position.

The second timer 143 is also adapted to activate the sound alarm 155. The switch 158, when opened, deactivates the sound alarm 155. After the second timer has discharged through the relay 137, both timers 131 and 143 return to their initial quiescent states to await the next triggering of the first timer 131. The use of the basic circuit, illustrated in FIG. 4, will result in one activation and one deactivation of the motor 74 during a predetermined time period. In the event multiple activations and deactivations of the motor are desirable, the remaining timers can be utilized.

The third timer 167 and the fourth timer 173 act concertedly to permit timing periods of several hours or more. When the switch 161 is disposed in a closed attitude, the clock 125 causes the output on the third timer switch 167 and fourth timer 173 to switch to a low state. At the end of a predetermined timing period, the output of timers 167 and 173 return to a high state. Such high state provides a voltage supply for the fifth timer 185 which self-triggers upon the application of voltage thereto. The timing network of the fifth timer generates a short output pulse which activates the first timer 131 to initiate another cycle of activation and deactivation of the motor 74. In the event a greater number than two cycles of activation and deactivation of the motor 74 are desired, it will be seen that the basic circuit layout can be suitably expanded.

OPERATION

The operation of the device of the present invention is believed apparent and is briefly summarized at this point.

For utilization as an automated feeder for pets, such as a dog or cat, or for any other animal for whom periodic feedings while unattended are desired, the carousel portion 18 must first be loaded with suitable quantities of food and water.

In order to place food and water into the containers 68 of the carousel portion 18, the primary panel 89 of the cover assembly 20 is preferably lifted. Food is placed in one or more of the containers of an adjacent pair, and water is deposited in the corresponding containers of such pairs. The cover is then secured once again on the base portion 15 to permit setting of the timing cycle for the automated feeding of the animal.

Alternatively, the circuitry can be manually operated using the control-actuating button 179 to cause advancement of the carousel 18 by operation of the motor 74 to dispose individual pairs of containers 68 below the opening 102 of the primary panel.

As described previously, multiple feedings can be provided for by suitable programming of the clock 125 to cause sequential activation and deactivation of the motor 74 at prescribed intervals to advance the carousel portion 18 to dispose a pair of full containers 68 below the opening 102 for access thereto by the animal.

Activation of switch 158 causes the alarm 155 audibly to signal the animal at the start of each feeding interval.

The configuration of the base portion 15 permits deployment thereof in a corner location within a room, with a consequent minimization of the likelihood that the animal will move the feeder about the room in its efforts to obtain food and water from the containers 68. Further, the foot portion 47 of the base portion 15 is disposed to permit the animal being fed by the device to place one or both of its forepaws on the foot portion while consuming food or water, further to minimize the chances that the animal will displace the device while feeding. The stability of the device against slidable displacement from its point of deployment during the feeding cycle is enhanced by the provision of a substantially non-skid lower surface and low profile design.

It is seen that the animal feeder 10 of the present invention provides a convenient and easily utilized device for providing food and water at predetermined intervals to an unattended animal. Further, the device is characterized by ease of operation and simplicity of maintenance. Moreover, the device can be constructed having dimensions which suit it for use in the feeding of a widespread variety of animals having differing nutritional requirements.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. An animal feeding apparatus comprising:
   a substantially flat base;
   an electric drive motor supported by said base, said drive motor having a substantially upright drive shaft, said motor being connected to rotate said drive shaft about an upright axis of rotation;
   a tray removably secured to said drive shaft and mounted for rotation therewith, said tray having a plurality of containers of predetermined dimensions each adapted to contain a quantity of a selected consumble substance, said containers being disposed for movement along a path substantially concentric around the axis of rotation of said drive shaft, a plurality of switch operating structures on said tray corresponding in position and number to said plurality of containers;
   a cover assembly removably secured on the base in covering relation thereto and providing an edge defining an aperture of predetermined dimensions sufficient to expose at least one container for access by an animal thereto;
   a switch mounted on said cover assembly adjacent said switch operating structures and positioned to be successively operated by said switch operating structures as said tray rotates, said switch being connected to said electric motor to terminate power to said electric motor and stop said tray when said switch is actuated.

2. The animal feeding apparatus of claim 1 wherein said tray is polygonal in configuration.

3. The animal feeding apparatus of claim 2 wherein said drive motor is gear driven to prevent rotation of said drive shaft when said motor is not in operation.

4. The animal feeding apparatus of claim 3 wherein said base mounts electronic timer means selectively actuable for causing operation of said drive motor at predetermined spaced time intervals to rotate said tray.

5. An animal feeding apparatus comprising
   A. a housing having a substantially flat bottom panel having a predetermined proximal portion and a distal portion remote therefrom; a wall supported peripherally on the base in upstanding relation, the wall having a pair of side portions connected to each other on the distal portion of the bottom panel and spaced from each other on the proximal portion; and an internal wall extending between the side portions of the wall on the distal portion of the base to define a compartment bounded thereby;
   B. a drive motor borne by the base mounting a shaft and operable to rotate the shaft about an axis;
   C. a tray mounted by the base and connected to the shaft for rotation therewith within the side wall, the tray providing a central portion and a plurality of divider panels extending radially from the central portion in spaced apart relation, the panels bounding a plurality of substantially equally dimensioned containers adapted to contain food and water;
   D. timer means mounted in the compartment of the housing for causing the motor to rotate the tray at predetermined time spaced intervals to move the containers thereof to selected positions relative to the proximal portion of the bottom panel;
   E. a cover assembly having a primary panel and a secondary panel hingedly secured to the primary panel, the secondary panel being removably secured in covering relation to the compartment of the housing and the primary panel being removably secured in covering relation to portions of the tray and having an edge defining an aperture dimensioned to permit access by an animal to a pair of containers disposed thereunder; and
   F. a flange portion extending from the proximal portion of the bottom panel and dimensioned to support at least one foot of an animal utilizing the apparatus.

6. The apparatus of claim 5 wherein the timer means includes alarm means for signalling an animal when the motor has operated to move the tray.

7. The apparatus of claim 5 wherein the tray is polygonal.

8. The apparatus of claim 5 wherein the side portions of the wall are disposed in substantially perpendicular relation at the distal portion of the bottom panel.

9. The apparatus of claim 5 wherein the drive motor is geared to prevent rotation of the shaft when the motor is not in operation.

10. The animal feeding apparatus of claim 5 further having a digital time read-out clock.

11. The animal feeding apparatus of claim 5 in which said drive motor and tray are directly interconnected in fixed relation.

12. The animal feeding apparatus of claim 5 in which said drive motor has a remote source of electrical energy, an auxiliaus source of electrical energy, and means for automatically connecting said auxiliary source of electrical energy to said motor when said remote source of electrical energy is interrupted to insure continuity of operation of said motor.

13. The animal feeding apparatus of claim 5 in which the housing provides a flat bottom panel, a motor housing integral with the bottom panel and a non-skid surface on said flange portion radially extended from the motor housing.

14. The animal feeding apparatus of claim 5 in which said tray is removable for cleaning and loading.

15. The animal feeding apparatus of claim 5 including means for manually advancing said tray for loading and feeding purposes.

16. An animal feeding apparatus comprising:
   a housing having a substantially flat base having a front portion and a rear portion, an upstanding wall supported on said base, said wall having first and second side portions connected to each other on the rear portion of said base and spaced from each other on said front portion of said base, an internal upstanding wall extending between said side portions of said wall on the rear portion of said base to define a compartment bounded thereby;
   a drive motor mounted on said base, a shaft connected to be driven by said drive motor so that said shaft rotates about an axis;

a tray mounted on said shaft to rotate with said shaft, said tray being positioned adjacent said base and between said side walls, said tray being provided with a central portion and a plurality of divider panels extending radially from said central portion in spaced relation, said panels defining a plurality of open topped containers adapted to contain animal food;

electric timer means mounted in said compartment of said housing and connected to said motor for causing said motor to rotate said tray at predetermined time spaced intervals to move said containers thereof to selected positions relative to said front portion of said bottom panel, said electrically controlled timer means being susceptible to programming said apparatus for at least one feeding per day;

a cover assembly having a primary panel and a secondary panel hingedly secured to said primary panel, said secondary panel being removably secured in covering relation to said compartment of said housing and said primary panel being removably secured in covering relation to said tray, said primary panel having an edge defining an aperture dimensioned to permit access by an animal to a pair of containers in said tray; and a flange extending from said near portion of said bottom panel and dimensioned to support at least one foot of an animal utilizing said apparatus.

17. An animal feeding apparatus comprising:

a housing having a substantially flat bottom panel having a front portion and a rear portion, an upstanding wall supported on said base, said wall having first and second side portions connected to each other on the rear portion of said base and spaced from each other on said front portion of said base, an internal upstanding wall extending between said side portions of said wall on the rear portion of said base to define a compartment bounded thereby;

a drive motor mounted on said base, a shaft connected to be driven by said drive motor so that said shaft rotates about an axis;

a tray mounted on said shaft to rotate with said shaft, said tray being positioned adjacent said base and between said side walls, said tray being provided with a central portion and a plurality of divider panels extending radially from said central portion in spaced relation, said panels defining a plurality of open topped containers adapted to contain animal food;

electric timer means mounted in said compartment of said housing and connected to said motor for causing said motor to rotate said tray at predetermined time spaced intervals to move said containers thereof to selected positions relative to said front portion of said bottom panel, electrically controlled braking means for interrupting rotation of said tray at predetermined positions for feeding convenience.

* * * * *